(12) United States Patent
Yamamoto et al.

(10) Patent No.: US 6,229,581 B1
(45) Date of Patent: May 8, 2001

(54) PROJECTION TYPE PICTURE DISPLAY APPARATUS

(75) Inventors: Hideki Yamamoto; Tadashi Yoshida; Naruhiko Atsuchi; Kazuyuki Shirai; Takayuki Yoshioka; Isao Tomisawa, all of Yamanshi-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/075,263

(22) Filed: May 11, 1998

(30) Foreign Application Priority Data

May 13, 1997 (JP) .................................................. 9-137695

(51) Int. Cl.[7] ........................................................ H04N 9/31
(52) U.S. Cl. ........................... 348/757; 348/756; 259/634; 259/638; 353/33
(58) Field of Search .................................. 348/757, 756, 348/751, 750, 761, 766, 752, 762, 767; 359/629, 634, 636, 638, 639, 640; 353/33, 48, 49; 349/5, 6, 7, 8, 9; H04N 9/31

(56) References Cited

U.S. PATENT DOCUMENTS

| | | | |
|---|---|---|---|
| 4,464,018 | * 8/1984 | Gagnon | 348/751 |
| 4,687,301 | * 8/1987 | Ledebuhr | 348/751 |
| 5,130,826 | * 7/1992 | Takanashi et al. | 348/757 |
| 5,400,180 | * 3/1995 | Chung | 348/757 |
| 5,488,436 | * 1/1996 | Choi et al. | 348/751 |
| 5,644,432 | * 7/1997 | Doany | 359/634 |
| 5,786,873 | * 7/1998 | Chiu et al. | 348/756 |

\* cited by examiner

*Primary Examiner*—Michael Lee
(74) *Attorney, Agent, or Firm*—Arent Fox Kintner Plotkin & Kahn, PLLC

(57) ABSTRACT

A projection type picture display apparatus, includes a light source; a polarizing beam splitter capable of reflecting or transmitting an incident light; a decomposing/synthesizing prism assembly capable of receiving a reflected light from the polarizing beam splitter to decompose the incident light into red, green and blue lights, also capable of receiving reflected red, green and blue lights to synthesize these lights so as to produce a synthesized light; a plurality of reflective type liquid crystal displays capable of receiving, modulating and reflecting red, green and blue lights; a projection optical system capable of receiving a picture light passing through the polarizing beam splitter to project an enlarged picture on a screen. In particular, the decomposing/synthesizing prism assembly has a first dichroic mirror reflecting a first color light but transmitting a second and third color lights, and has a second dichroic mirror reflecting the second color light but transmitting the first and third color lights, with the first and second dichroic mirror intersected with each other at a predetermined operable angle.

9 Claims, 4 Drawing Sheets

PROJECTION TYPE PICTURE DISPLAY APPARATUS

BACKGROUND OF THE INVENTION

The present invention relates to a picture display apparatus, in particular to a projection type picture display apparatus using reflective type liquid crystal display means.

FIG. 4 is an explanatory view indicating a conventional system for use as a projection type picture display apparatus. As shown in FIG. 4, a white light from a light source 1 is incident on a YDM (Yellow Reflecting Dichroic Mirror) 2a to be divided into a blue light which is a rectilinear light rectilinearly propagated through the YDM 2a, and a two-color light (including a green light and a red light) reflected from the YDM 2a.

Referring again to FIG. 4, the blue light rectilinearly propagated through the YDM 2a is reflected by a reflecting mirror 3a and then incident on a light transmissible liquid crystal panel 4a (for use in processing a blue light). On the other hand, the two-color light (including a green light and a red light) is incident on a GDM (Green Reflecting Dichroic Mirror) 2b to be divided into a green light and a red light, respectively. Here, the green light is a reflected light from the GDM 2b, whilst the red light is a rectilinear light rectilinearly propagated through the GDM 2b. The green light reflected from the GDM 2b is incident on a light transmissible liquid crystal panel 4b (for use in processing a green light). On the other hand, the red light rectilinearly propagated through the GDM 2b is reflected by a reflecting mirror 3b and a further by a reflecting mirror 3c so as to be incident on a light transmissible liquid crystal panel 4c (for use in processing a red light).

The light transmissible liquid crystal panel 4a (for use in processing a blue light), the light transmissible liquid crystal panel 4b (for use in processing a green light), the light transmissible liquid crystal panel 4c (for use in processing a red light), each comprises a pair of transparent electrode substrates forming an internal space therebetween which is filled with a liquid crystal so as to form a plurality of liquid crystal cells. Further, each of the light transmissible liquid crystal panels 4a, 4b, 4c includes on both sides thereof a pair of polarizing plates which are provided to cause a blue, green or red light to be incident onto a light synthesizing cross-prism 5.

The light synthesizing cross-prism 5 has a pair of dichroic mirrors 5a, 5b each consisting of a deposition film, which are arranged in a mutually crossed manner so that they are able to reflect or transmit various lights (blue, green and red lights).

In this way, a red light is allowed to pass through the dichroic mirror 5b and then reflected by the dichroic mirror 5a. A blue light is allowed to be reflected by the dichroic mirror 5b and then pass through the dichroic mirror 5a. Further, a green light is allowed to first pass through the dichroic mirror 5b and thens through the dichroic mirror 5a. Therefore, various lights (blue, green and red lights) are synthesized in the light synthesizing cross-prism 5 to form a picture which is then enlarged through a projection lens 6 so as to be projected on a screen 7.

However, with the above-described conventional system shown in FIG. 4, since an optical system for dividing an incident white light into various color lights is space-apart from an optical system for synthesizing together individual color lights, the whole system for use as a projection type picture display apparatus has to be large in size, making it difficult to manufacture a picture display apparatus at a low cost.

SUMMARY OF THE INVENTION

It is an object of the present invention to provide an improved system for use as a projection type picture display apparatus which is compact in size and may be manufactured at a low cost, so as to solve the above-mentioned problems peculiar to the above-mentioned prior arts.

According to the present invention, there is provided a projection type picture display apparatus, comprising: a light source; a polarizing beam splitter capable of reflecting or transmitting an incident light; a decomposing/synthesizing prism assembly capable of receiving a reflected light from the polarizing beam splitter to decompose the incident light into red, green and blue lights, also capable of receiving reflected red, green and blue lights to synthesize these lights so as to produce a synthesized light which is then incident on the polarizing beam splitter; a plurality of reflective type liquid crystal display means capable of receiving, modulating and reflecting red, green and blue lights; a projection optical system capable of receiving a picture light passing through the polarizing beam splitter to project an enlarged picture on a screen. In particular, the decomposing/synthesizing prism assembly has a first dichroic mirror reflecting a first color light but transmitting a second and third color lights, and has a second dichroic mirror reflecting the second color light but transmitting the first and third color lights, with the first and second dichroic mirrors intersected with each other at a predetermined operable angle.

In one aspect of the present invention, the decomposing/synthesizing prism assembly comprises four right-angle prisms bonded together by means of an adhesive on their right-angle surfaces, forming the first and second dichroic mirrors intersected with each other in a crossed manner. In detail, the decomposing/synthesizing prism assembly is formed in a manner such that, an angle between the main beam of an incident light and the normal line of each dichroic mirror is 45°.

In another aspect of the present invention, the decomposing/synthesizing prism assembly may comprise four cubical trapezoidal prisms bonded together by means of an adhesive, forming the first and second dichroic mirrors intersected with each other at an angle of about 60°. In detail, the decomposing/synthesizing prism assembly may be formed in a manner such that, an angle between the main beam of an incident light and the normal line of each dichroic mirror is 30°.

In a further aspect of the present invention, the decomposing/synthesizing prism assembly may be comprised by a plate forming a first dichroic mirror and another plate forming a second dichroic mirror, both of the plates being disposed in an optical case filled with an optical liquid.

The above objects and features of the present invention will become better understood from the following description with reference to the accompanying drawings.

DETAILED DESCRIPTION OF THE PREFERRED EMBODIMENTS

Figure 1:
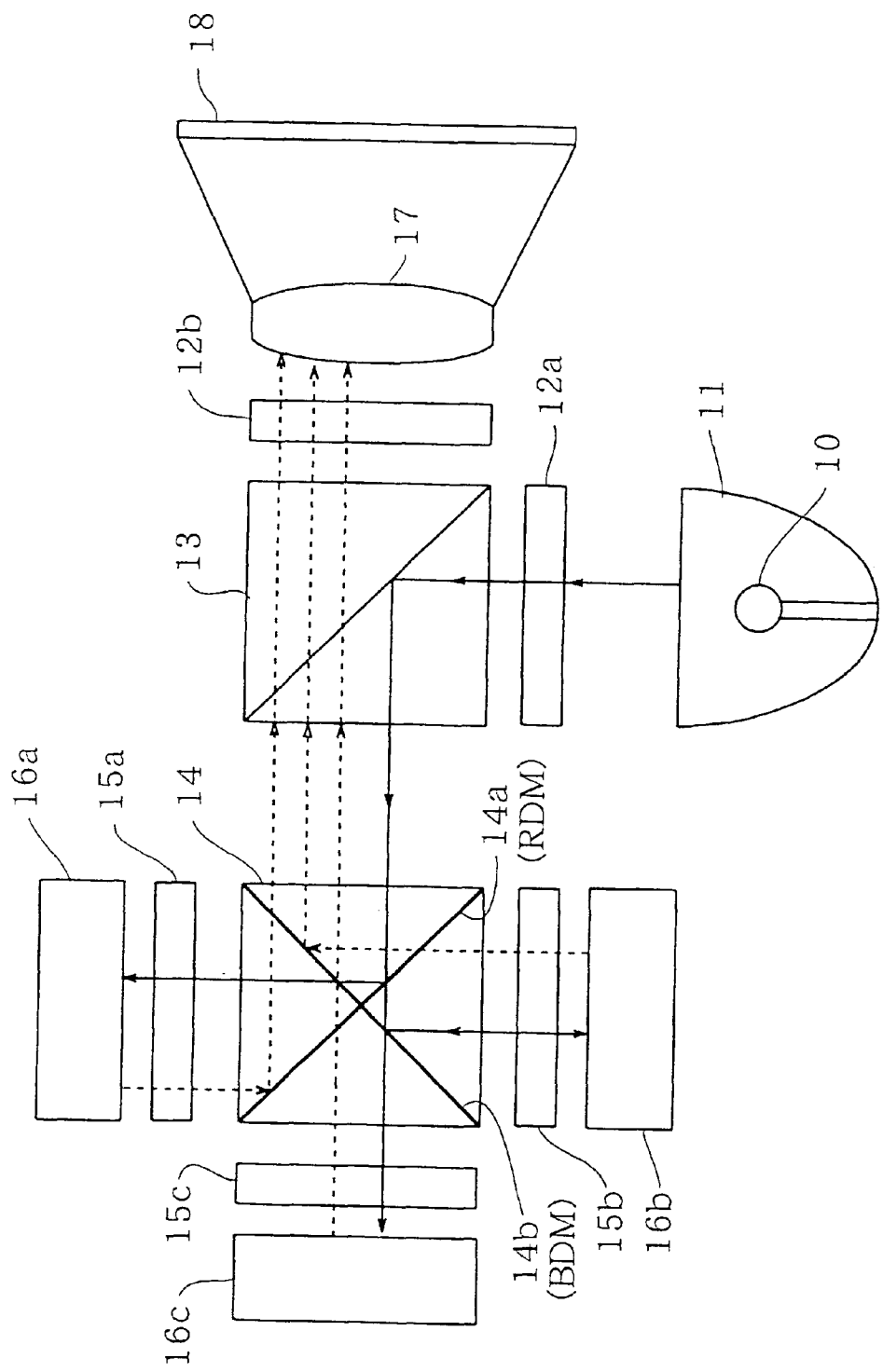
FIG. 1 is an explanatory view schematically illustrating an optical system for use as a projection type picture display apparatus, according to a first embodiment of the present invention.

Referring to FIG. 1 showing a first embodiment of the present invention, reference numeral 10 is a white light source including a halogen lamp and a xenon lamp. A white light emitted from the white light source 10 is reflected by a reflector 11 to form a number of generally collimated beams which are then incident on a polarizing sheet 12a. The polarizing sheet 12a is adapted to transmit a first polarized light component of the light from the reflector 11, but absorb a second polarized light component thereof. A light beam passed through the polarizing sheet 12a is then incident on a polarizing beam splitter 13 and reflected by a polarizing surface thereof. A reflected light from the polarizing beam splitter 13 is thus incident to a decomposing/synthesizing prism assembly 14.

The decomposing/synthesizing prism assembly 14 includes four right-angle prisms bonded together by means of an adhesive, forming a first dichroic mirror 14a (for selecting and reflecting a first wavelength light) and a second dichroic mirror 14b (for selecting and reflecting a second wavelength light). The first and second dichroic mirrors 14a, 14b are arranged in a generally crossed manner such that an angle of about 45° will be formed between a main beam of an incident light and the normal line of each dichroic mirror.

Further, the first and second dichroic mirrors (14a, 14b), are each formed by several tens of dielectric layers such as $TiO_2$ and $SiO_2$ layers which are alternatively laminated together to be able to select and reflect a light having a predetermined wavelength.

The first dichroic mirror (RDM) 14a is adapted to reflect a red light (a first light), but transmit a green light (a second light) and a blue light (a third light).

The second dichroic mirror (BDM) 14b is adapted to reflect a blue light (a third), but transmit a red light (a first light) and a green light (a second light).

A red light reflected by the first dichroic mirror (RDM) 14a is passed through a phase differential plate 15a to be incident to a reflective type liquid crystal display means 16a (for use in processing a red light). A blue light reflected by the second dichroic mirror (BDM) 14b is passed through a phase differential plate 15b to be incident to a reflective type liquid crystal display means 16b (for use in processing a blue light). Further, a green light passed first through the first dichroic mirror (RDM) 14a then through the second dichroic mirror (BDM) 14b is passed through a phase differential plate 15c to be incident to a reflective type liquid crystal display means 16c (for use in processing a green light).

A light modulated in the reflective type liquid crystal display means 16a (for use in processing a red light) is again passed through the phase differential plate 15a to be incident to the decomposing/synthesizing prism assembly 14, in which the red light is first reflected by the first dichroic mirror 14a (RDM) and is then passed through the second dichroic mirror 14b (BDM). A light modulated in the reflective type liquid crystal display means 16b (for use in processing a blue light) is again passed through the phase differential plate 15b to be incident to the decomposing/synthesizing prism assembly 14, in which the blue light is first passed through the first dichroic mirror 14a (RDM) and is then reflected by the second dichroic mirror 14b (BDM).

A light modulated in the reflective type liquid crystal display means 16c (for use in processing a green light) is again passed through the phase differential plate 15c to be incident to the decomposing/synthesizing prism assembly 14, in which the green light is first passed through the first dichroic mirror 14a (RDN) and is then passed through the second dichroic mirror 14b (BDM).

A composite light synthesized in the decomposing/synthesizing prism assembly 14 is passed through the polarizing beam splitter 13 and the polarizing sheet 12b, then is enlarged and projected onto a screen 18 through a projection lens 17.

It will be appreciated from the above description that one of the most important significances between the present invention and the above-discussed prior art is that a plurality of reflective type liquid crystal display means 16a–16c are used together with a decomposing/synthesizing prism assembly 14, so that both light decomposition and light synthesizing may be effected within a single decomposing/synthesizing prism assembly 14 by the reciprocating of the individual lights.

Figure 2:
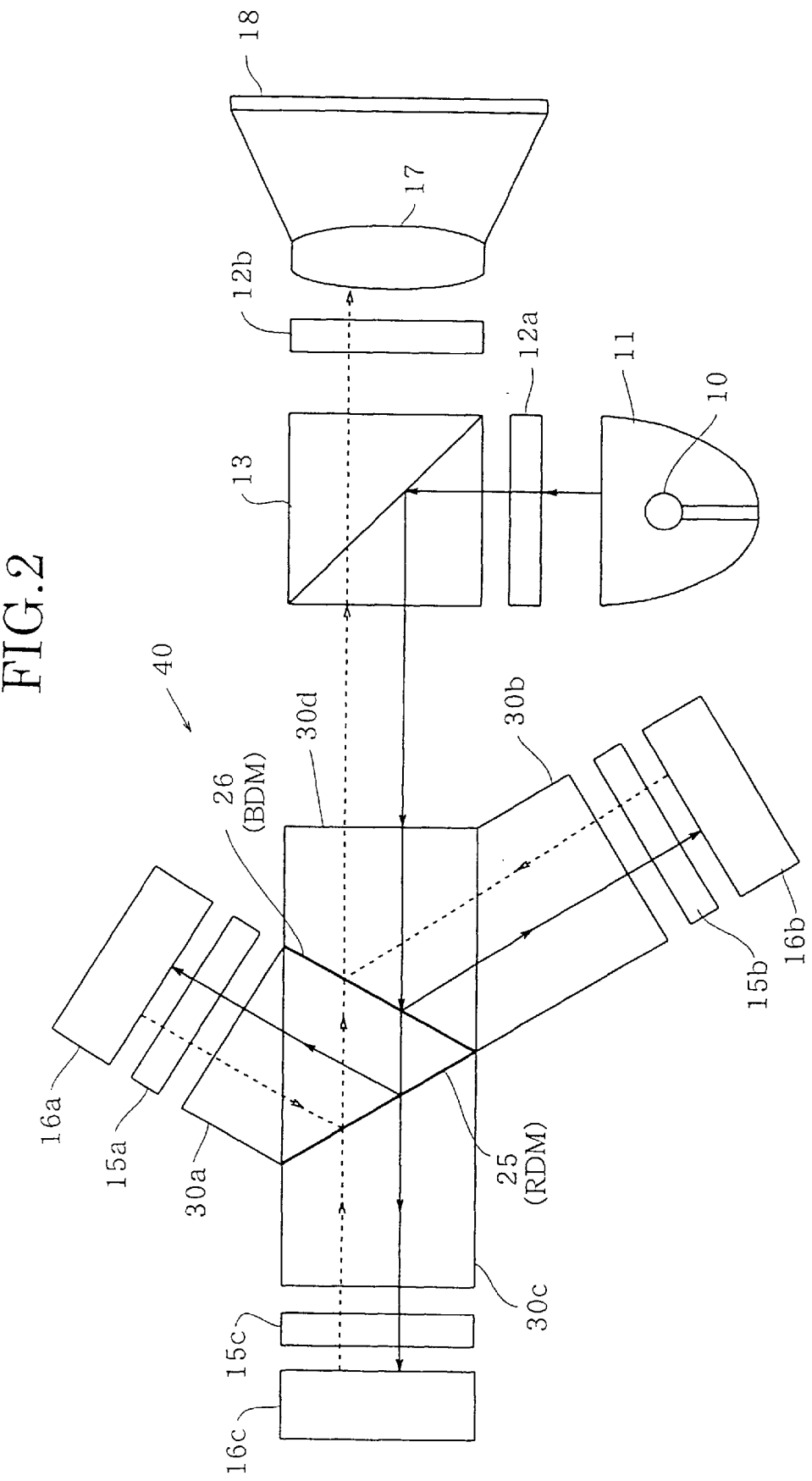
FIG. 2 is an explanatory view schematically illustrating an optical system for use as a projection type picture display apparatus, according to a second embodiment of the present invention.

FIG. 2 illustrates a second embodiment of the present invention. As shown in FIG. 2, a decomposing/synthesizing prism assembly 40 is comprised of four cubical trapezoidal prisms 30a–30d having shapes identical with one another.

Figure 3:
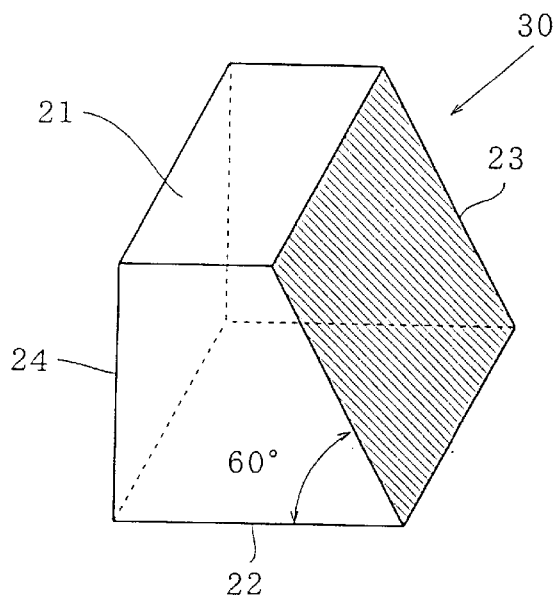
FIG. 3a is a perspective view illustrating a cubical trapezoidal prism forming a part of a decomposing/synthesizing prism assembly used in the projection type picture display apparatus, according to the second embodiment.
FIG. 3b is a perspective view illustrating a decomposing/synthesizing prism assembly for use in the projection type picture display apparatus, according to the second embodiment.
Figure 3:
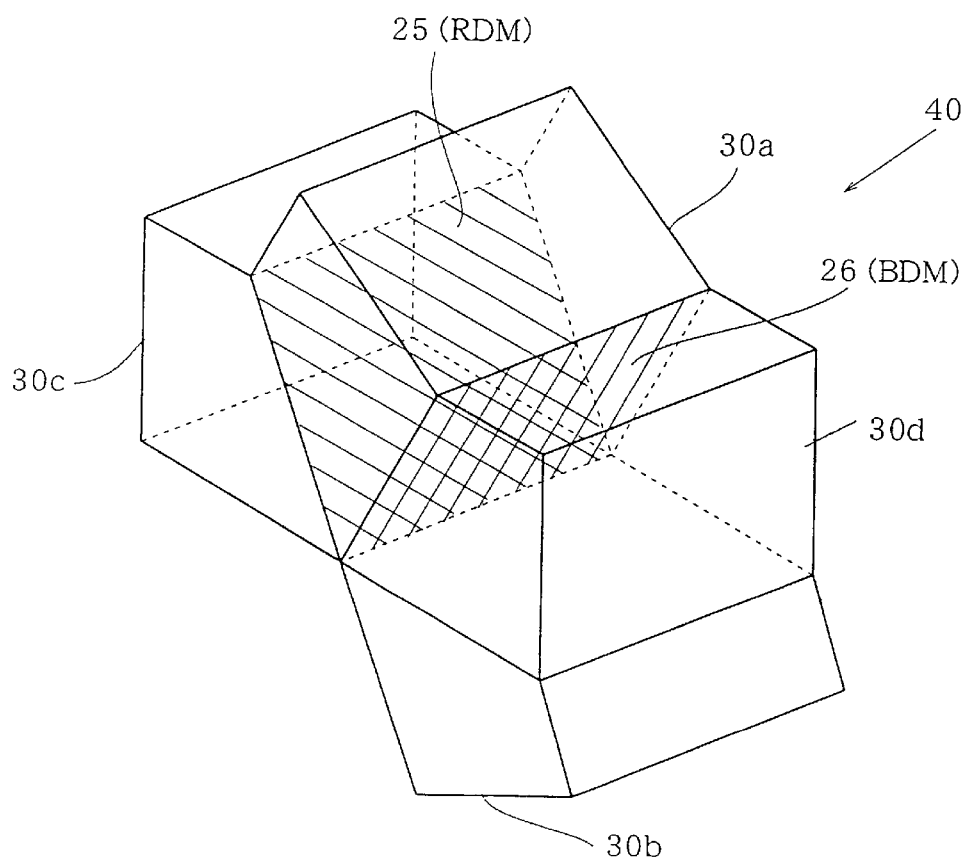
Figure 4:
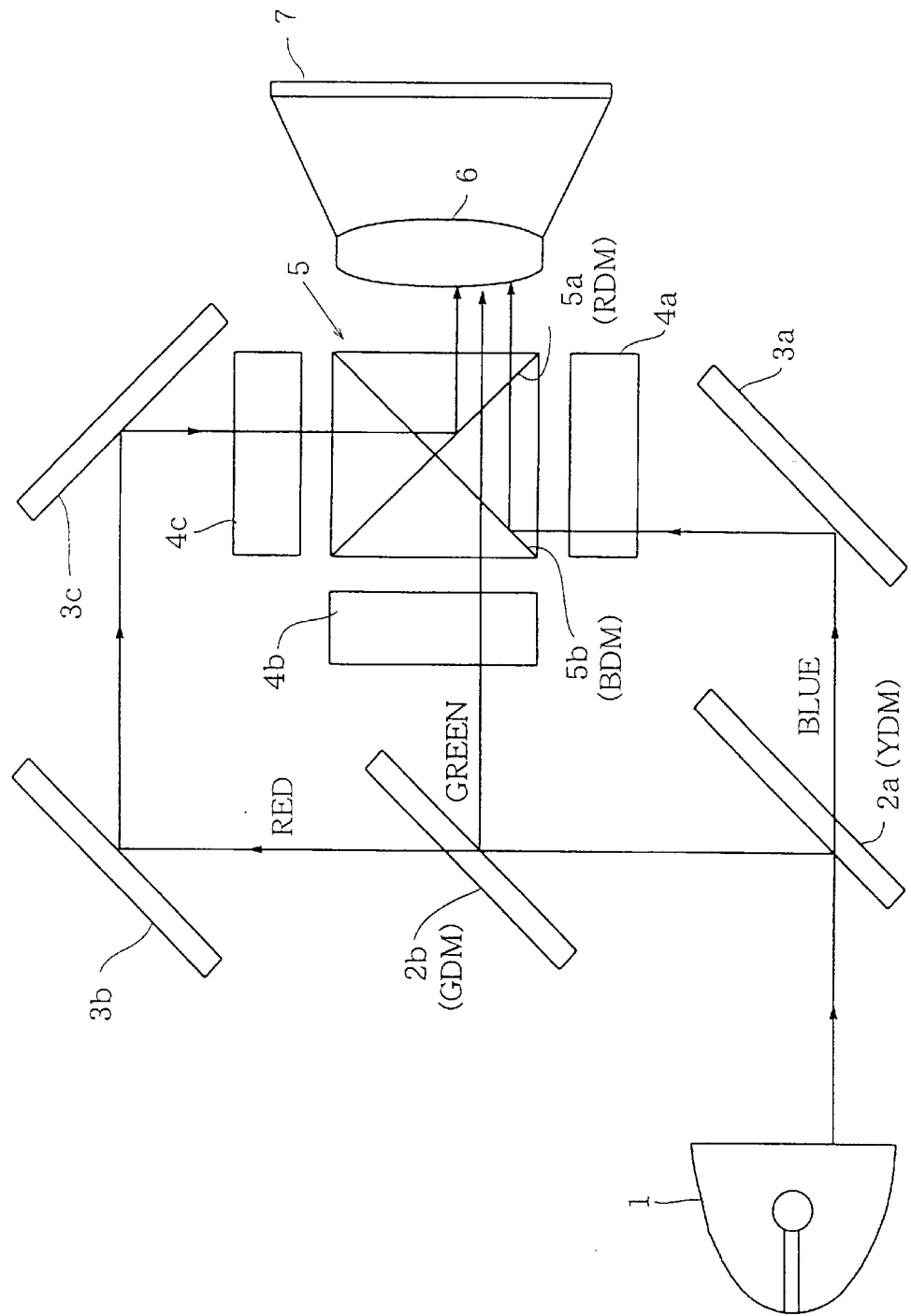
FIG. 4 is an explanatory view schematically illustrating a conventional optical system for use as a projection type picture display apparatus, according to a prior art.

Referring to FIG. 3a, each cubical trapezoidal prism 30 has a rectangular top surface 21, a rectangular bottom surface 22, a side surface 24 orthogonal to both the top surface 21 and bottom surface 22, an inclined surface 23 (hatched portion) intersected with the top surface 21 at an angle of 120°, and intersected with the bottom surface 22 at an angle of 60°.

FIG. 3b illustrates a decomposing/synthesizing optical system 40 formed by assembling the four cubical trapezoidal prisms 30a–30d. As shown in FIG. 3b, a first dichroic mirror (RDM) 25 for selecting and reflecting a first wavelength light is provided on the inclined surface 23 of a cubical trapezoidal prism 30a, whilst a second dichroic mirror (BDM) 25 for selecting and reflecting a second wavelength light is provided on the bottom surface 23 thereof. Similarly, each of the first and second dichroic mirrors 25, 26 is formed by several tens of dielectric layers such as $TiO_2$ and $SiO_2$ layers which are alternatively laminated together to be able to select and reflect a light having a predetermined wavelength.

Referring again to FIG. 3b, the inclined surface 23 of the cubical trapezoidal prism 30a (for use in processing a red light) and the inclined surface 23 of the cubical trapezoidal prism 30c (for use in processing a green light) are mutually bonded to each other by means of an adhesive. Namely, the two inclined surfaces 23, 23 are bonded together completely by making one side of the top surface 21 of the prism 30a coincident with a corresponding side of the top surface 21 of the prism 30c, such that the side surface 24 of the prism 30c is arranged in a direction forming an angle of 30° with the inclined surface 23 of the prism 30a.

Further, the side surface 24 of the prism 30a is arranged in a direction forming an angle of 30 with the inclined surface 23 of the prism 30c.

Similarly, the bottom surface 22 of the cubical trapezoidal prism 30a and the inclined surface 23 of the cubical trapezoidal prism 30d (for use in passing a light) are mutually bonded together by means of the same adhesive.

At this moment, the side surface 24 of the prism 30a is arranged to be connected with the top surface 21 of the prism 30d, whilst the inclined surface 23 of the prism 30a is arranged to be connected with the bottom surface 22 of the prism 30d. In this way, the side surface 24 of the prism 30c becomes parallel with and opposed to the side surface 24 of the prism 30d.

Further, the bottom surface 22 of the cubical trapezoidal prism 30d and the inclined surface 23 of the cubical trapezoidal prism 30b (for use in passing a blue light) are mutually bonded together by means of the same adhesive. On the other hand, a boundary line between the inclined surface 23 and the bottom surface 22 of the prism 30b is in coincident with a boundary line between the inclined surface 23 and the bottom surface 22 of the prism 30d, so that the side surface 24 of the prism 30b is arranged in a direction turned 30 degrees from the inclined surface 23 of the prism 30d.

The operation of a projection type picture display apparatus using the decomposing/synthesizing prism assembly 40 may be described with reference to FIG. 2.

Referring to FIG. 2, a light emitted from a light source 10 is reflected by a reflector 11 to form a number of generally collimated beams. The collimated beams are then passed through a polarizing sheet 12a and is reflected by a polarizing beam splitter 13 so as to be incident on the side surface 24 of the prism 30d of the decomposing/synthesizing prism assembly 40.

Referring again to FIG. 2, the incident light passing through the side surface 24 of the prism 30d is incident on and a second dichroic mirror (BDM) 26 at an angle of 30° with the normal line of the dichroic mirror 26 which reflects a blue light but allows the passing of a red light and a green light. The reflecting angle of the reflected blue light is 60° with respect to an incident light. Then, the blue light reflected from the second dichroic mirror (BDM) 26 is passed through a phase differential plate 15b so as to be incident on a reflective type liquid crystal display means 16b (for use in processing a blue light).

On the other hand, a red light and a green light are passed through the second dichroic mirror (BDM) 26 and are incident on a first dichroic mirror (RDM) 25 at an angle of 30° with respect to the normal line of the mirror 25 which reflects a red light but allows the passing of the green light.

The green light passing through the first dichroic mirror (RDM) 25 is passed through a phase differential plate 15c so as to be incident on a reflective type liquid crystal display means 16c (for use in processing a green light).

Meanwhile, the red light reflected by the first dichroic mirror (RDM) 25 is passed through a phase differential plate 15a so as to be incident on a reflective type liquid crystal display means 16a (for use in processing a red light).

The various lights (blue, red and green lights) are modulated respectively in the reflective type liquid crystal display means 16a–16c, while the modulated lights are again passed through the phase differential plates 15a–15c respectively, so as to be individually incident on the decomposing/synthesizing prism assembly 40, along optical paths shown by broken lines in FIG. 2. In this way, the individual color lights (blue, red and green lights) are synthesized in the decomposing/synthesizing prism assembly 40 to produce a synthesized picture light. Then, the synthesized picture light is passed through the polarizing beam splitter 13 and the polarizing sheet 12b so as to be incident on a projection lens 17, thereby allowing a picture to be enlarged and projected on the screen 18.

An important significance between the first and second embodiments of the present invention is that the second embodiment employs a decomposing/synthesizing prism assembly which is constructed such that with each of the first and second dichroic mirrors, an angle between an incident light and the normal line of each dichroic mirror is 30°. Since an angle between an incident light and the normal line of a dichroic mirror is set at 30° which is remarkably smaller than 45°, even if an incident angle of an incident light changes undesirably due to some uncontrollable factors, the wavelength characteristic of a reflected or rectilinearly propagated light will not be affected to any extent.

Although in the above first and second embodiments it has been described that a decomposing/synthesizing prism assembly is formed by four right-angle or cubical trapezoidal prisms, it is also possible that a decomposing/synthesizing optical system may be comprised by a plate forming a first dichroic mirror and another plate forming a second dichroic mirror, with both plates disposed in an optical case filled with an optical liquid.

As is appreciated from the above description, according to the first embodiment of the present invention, since a plurality of reflective type liquid crystal display means 16a–16c are used together with a decomposing/synthesizing prism assembly 14, both light decomposition and light synthesizing may be effected within a single decomposing/synthesizing prism assembly by the reciprocating of the individual lights, thereby reducing the total number of optical elements and making it possible to manufacture a picture display apparatus at a low cost.

Further, according to the second embodiment of the present invention, since a decomposing/synthesizing optical system is constructed such that an angle between an incident light and the normal line of each dichroic mirror is 30° which is remarkably smaller than 45°, even if an incident angle of an incident light changes undesirably due to some uncontrollable factors, the wavelength characteristic of a reflected or rectilinearly propagated light will not be affected to any extent.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A projection type picture display apparatus, comprising:

a light source;

a polarizing beam splitter capable of reflecting or transmitting an incident light;

a decomposing/synthesizing prism assembly capable of receiving a reflected light from the polarizing beam splitter to decompose the incident light into red, green and blue lights, also capable of receiving reflected red, green and blue lights to synthesize these lights so as to produce a synthesized light which is then incident on the polarizing beam splitter;

a plurality of reflective type liquid crystal display means capable of receiving, modulating and reflecting red, green and blue lights;

a projection optical system capable of receiving a picture light passing through the polarizing beam splitter to project an enlarged picture on a screen; and a phase differential plate is provided between each reflective type liquid crystal display means and the decomposing/synthesizing prism assembly, wherein the decomposing/synthesizing prism assembly has a first dichroic mirror reflecting a first color light but transmitting a second and third color lights, and has a second dichroic mirror reflecting the second color light but transmitting the first and third color lights, with the first and second dichroic mirrors intersected with each other at a predetermined operable angle.

2. The projection type picture display apparatus according to claim 1, wherein the decomposing/synthesizing prism assembly comprises four right-angle prisms bonded together by means of an adhesive on their right-angle surfaces, forming the first and second dichroic mirrors intersected with each other in a crossed manner.

3. The projection type picture display apparatus according to claim 2, wherein the decomposing/synthesizing prism assembly is formed in a manner such that, an angle between the main beam of an incident light and the normal line of each dichroic mirror is 45°.

4. The projection type picture display apparatus according to claim 1, wherein the decomposing/synthesizing prism assembly comprises four cubical trapezoidal prisms bonded together by means of an adhesive, forming the first and second dichroic mirrors intersected with each other at an angle of about 60°.

5. The projection type picture display apparatus according to claim 4, wherein the decomposing/synthesizing prism assembly is formed in a manner such that, an angle between the main beam of an incident light and the normal line of each dichroic mirror is 30°.

6. The projection type picture display apparatus according to claim 1, wherein the decomposing/synthesizing prism assembly may be comprised by a plate forming a first dichroic mirror and another plate forming a second dichroic mirror, both of the plates being disposed in an optical case filled with an optical liquid.

7. A projection type picture display apparatus, comprising:
  a light source;
  a polarizing beam splitter capable of reflecting or transmitting an incident light;
  a decomposing/synthesizing prism assembly capable of receiving a reflected light from the polarizing beam splitter to decompose the incident light into red, green and blue lights, also capable of receiving reflected red, green and blue lights to synthesize these lights so as to produce a synthesized light which is then incident on the polarizing beam splitter;
  a plurality of reflective type liquid crystal display means capable of receiving, modulating and reflecting red, green and blue lights;
  a projection optical system capable of receiving a picture light passing through the polarizing beam splitter to project an enlarged picture on a screen;
  wherein the decomposing/synthesizing prism assembly is formed by four right-angle prisms, providing a first dichroic mirror reflecting a first color light but transmitting a second and third color lights, and a second dichroic mirror reflecting the second color light but transmitting the first and third color lights, with the first and second dichroic mirrors intersected with each other at a predetermined operable angle and with an angle of 45° formed between a main beam of an incident light and the normal line of each dichroic mirror;
  wherein the first, second and third color lights obtained by decomposing the reflected light from the polarizing beam splitter are directly directed to the plurality of reflective type liquid crystal display means without being reflected before reaching the plurality of reflective type liquid crystal display means;
  wherein a phase differential plate is provided between each reflective type liquid crystal display means and the decomposing/synthesizing prism assembly.

8. A projection type picture display apparatus, comprising:
  a light source;
  a polarizing beam splitter capable of reflecting or transmitting an incident light;
  a decomposing/synthesizing prism assembly capable of receiving a reflected light from the polarizing beam splitter to decompose the incident light into red, green and blue lights, also capable of receiving reflected red, green and blue lights to synthesize these lights so as to produce a synthesized light which is then incident on the polarizing beam splitter;
  a plurality of reflective type liquid crystal display means capable of receiving, modulating and reflecting red, green and blue lights;
  a projection optical system capable of receiving a picture light passing through the polarizing beam splitter to project an enlarged picture on a screen;
  wherein the decomposing/synthesizing prism assembly is formed by four cubical trapezoidal prisms, providing a first dichroic mirror reflecting a first color light but transmitting a second and third color lights, and a second dichroic mirror reflecting the second color light but transmitting the first and third color lights, with the first and second dichroic mirrors intersected with each other at a predetermined operable angle, and with an angle of 30° formed between a main beam of an incident light and the normal line of each dichroic mirror;
  wherein the first, second and third color lights obtained by decomposing the reflected light from the polarizing beam splitter are directly directed to the plurality of reflective type liquid crystal display means without being reflected before reaching the plurality of reflective type liquid crystal display means;
  wherein a phase differential plate is provided between each reflective type liquid crystal display means and the decomposing/synthesizing prism assembly.

9. A projection type picture display apparatus, comprising:
  a light source;
  a polarizing beam splitter capable of reflecting or transmitting an incident light;
  a decomposing/synthesizing prism assembly capable of receiving a reflected light from the polarizing beam splitter to decompose the incident light into red, green and blue lights, also capable of receiving reflected red, green and blue lights, also capable of receiving reflected red, green and blue lights to synthesize these lights so as to produce a synthesized light which is then incident on the polarizing beam splitter;
  a plurality of reflective type liquid crystal display means capable of receiving, modulating and reflecting red, green and blue lights;
  a projection optical system capable of receiving a picture light passing through the polarizing beam splitter to project an enlarged picture on a screen;

a polarizing sheet disposed between the projection optical system and the polarizing beam splitter and another polarizing sheet disposed between the polarizing beam splitter and the light source;

wherein the decomposing/synthesizing prism assembly has a first dichroic mirror reflecting a first color light but transmitting a second and third color lights, and a second dichroic mirror reflecting the second color light but transmitting the first and third color lights, with the first and second dichroic mirrors intersected with each other at a predetermined operable angle;

wherein the first, second and third color lights obtained by decomposing the reflected light from the polarizing beam splitter are directly directed to the plurality of reflective type liquid crystal display means without being reflected before reaching the plurality of reflective type liquid crystal display means;

wherein a phase differential plate is provided between each reflective type liquid crystal display means and the decomposing/synthesizing prism assembly.

* * * * *